US007756773B2

(12) United States Patent
Du Preez et al.

(10) Patent No.: US 7,756,773 B2
(45) Date of Patent: Jul. 13, 2010

(54) SYSTEM AND METHOD FOR CONDUCTING ONLINE AUCTIONS

(75) Inventors: Anthony Gert Du Preez, Malvern East (AU); Jason Scott Ellenport, East Brighton (AU); Brendan Joseph Comas, Prahran (AU)

(73) Assignee: OzB2B Pty. Ltd. (AU)

( * ) Notice: Subject to any disclaimer, the term of this patent is extended or adjusted under 35 U.S.C. 154(b) by 1379 days.

(21) Appl. No.: 10/506,902

(22) PCT Filed: Mar. 7, 2003

(86) PCT No.: PCT/AU03/00279

§ 371 (c)(1),
(2), (4) Date: May 23, 2005

(87) PCT Pub. No.: WO03/075193

PCT Pub. Date: Sep. 12, 2003

(65) Prior Publication Data

US 2005/0234798 A1    Oct. 20, 2005

(30) Foreign Application Priority Data

Mar. 7, 2002    (AU)    ................................. PS 0957

(51) Int. Cl.
*G06Q 40/00*    (2006.01)
(52) U.S. Cl. ........................ 705/37; 705/1; 705/26; 705/35
(58) Field of Classification Search ............... 705/26, 705/27, 35, 1
See application file for complete search history.

(56) References Cited

U.S. PATENT DOCUMENTS 5,615,269 A * 3/1997 Micali ........................ 705/80

| 6,499,018 | B1 * | 12/2002 | Alaia et al. | 705/37 |
| 6,647,373 | B1 * | 11/2003 | Carlton-Foss | 705/37 |
| 7,373,325 | B1 * | 5/2008 | Hadingham et al. | 705/37 |

(Continued)

FOREIGN PATENT DOCUMENTS

| WO | WO 01/43040 A2 | 6/2001 |
| WO | 02/21347 A1 | 3/2002 |

OTHER PUBLICATIONS

Jeremy Bulow and Paul Klemperer, Auctions Versus Negotiations, The American Economic Review; Mar. 1996, pp. 180-194.*

*Primary Examiner*—Jason Dunham
(74) *Attorney, Agent, or Firm*—Christopher J. Kulish

(57) ABSTRACT

The invention relates to a system and method for conducting online auctions, and has particular application in conducting business on-line over a network of computers such as the Internet, for establishing materials supply contracts. In particular, the invention relates to control of a reserve price in an online bidding event. An online auction between a controlling party and at least two competing participants comprises the steps of setting a reserve price for the auction, conducting the auction between the at least two competing parties, determining whether a predetermined time trigger has been reached and suspending the auction if the reserve price is not reached at the time, determining whether the controlling party has selected to enter an optional reserve price negotiation phase, and revising the reserve price for that reserve price negotiation phase, and accordingly, extending the auction based on the revised reserve price. In application to a factored reserve or forward auction event, the invention allows the transparency and integrity of the real time negotiation process to be maintained beyond the normal bidding event and into an auction extension phase based on the revised reserve price.

20 Claims, 4 Drawing Sheets

U.S. PATENT DOCUMENTS

| | | | |
|---|---|---|---|
| 2002/0026400 A1* | 2/2002 | Narayan et al. | 705/37 |
| 2002/0161689 A1* | 10/2002 | Segal | 705/37 |
| 2003/0018513 A1* | 1/2003 | Hoffman et al. | 705/10 |
| 2007/0208656 A1* | 9/2007 | Feaver et al. | 705/37 |

* cited by examiner

| BID TIME | ACTUAL RESERVE PRICE | FACTORED RESERVE PRICE | SUBMITTED BID | FACTORED BID | CUR. | BID TYPE | BIDDER |
|---|---|---|---|---|---|---|---|
| 13 MAY 2002 10:00:00 AEST | 10,000,000 | 10,000,989.01 | | | AUD | INITIAL RESERVE | BUYER 1 |
| 14 MAY 2002 10:18:55 AEST | | | 14,000,000.00 | 14,002,345.68 | AUD | INITIAL QUOTE | SUPPLIER 3 |
| 14 MAY 2002 11:18:55 AEST | | | 13,500,000.00 | 13,501,627.91 | AUD | INITIAL QUOTE | SUPPLIER 1 |
| 14 MAY 2002 09:18:55 AEST | | | 12,000,000.00 | 12,000,989.01 | AUD | INITIAL QUOTE | SUPPLIER 2 |
| 14 MAY 2002 10:18:55 AEST | 10,500,000 | 10,500,989.01 | | | AUD | REVISED RESERVE | BUYER 1 |
| 15 MAY 2002 16:03:48 AEST | | | 11,500,000.00 | 11,502,345.68 | AUD | NORMAL BID | SUPPLIER 3 |
| 15 MAY 2002 16:05:05 AEST | | | 11,485,000.00 | 11,486,627.91 | AUD | NORMAL BID | SUPPLIER 1 |
| 15 MAY 2002 16:06:42 AEST | | | 11,350,000.00 | 11,352,345.68 | AUD | NORMAL BID | SUPPLIER 3 |
| 15 MAY 2002 16:10:42 AEST | | | 11,250,000 | 11,250,989.01 | AUD | NORMAL BID | SUPPLIER 2 |
| 15 MAY 2002 10:18:55 AEST | 11,000,000 | 11,000,989.01 | | | AUD | REVISED RESERVE | BUYER 1 |
| 15 MAY 2002 16:12:42 AEST | | | 10,990,000 | 10,992,345.68 | AUD | NORMAL BID | SUPPLIER 3 |
| 15 MAY 2002 16:20:42 AEST | | | 10,800,000 | 10,801,627.91 | AUD | NORMAL BID | SUPPLIER 1 |
| 15 MAY 2002 16:25:42 AEST | | | 10,900,000 | 10,902,345.68 | AUD | BEST AND FINAL | SUPPLIER 3 |
| 15 MAY 2002 16:26:42 AEST | | | 10,500,000 | 10,501,627.91 | AUD | BEST AND FINAL | SUPPLIER 1 |
| 15 MAY 2002 16:27:42 AEST | | | 11,100,000.00 | 11,100,989.01 | AUD | BEST AND FINAL | SUPPLIER 2 |

*Fig. 4*

| | |
|---|---|
| ▓ | TIME EXTENSION PERIOD |
| ▓ | RESERVE PRICE NEGOTIATION |

SYSTEM AND METHOD FOR CONDUCTING ONLINE AUCTIONS

FIELD OF THE INVENTION

The present invention relates generally to a system and method for conducting online auctions. It has particular application in conducting business on-line over a network of computers such as the Internet, for establishing materials supply contracts. In particular, the invention relates to control of a reserve price in an online bidding event.

BACKGROUND

In applicant's copending application WO-02/21347 (filed 4 Sep. 2001), a 'factored bidding' online materials supply contract system is described. The system, involving a computer network including at least one buyer computer, an administrator computer and at least two supplier computers, makes it possible for a buyer to establish an underlying base supply contract with multiple approved suppliers, to prepare a 'Request for Quotation' (RFQ) and issue this as a 'Bill of Materials' (BOM) to those approved suppliers, and then to conduct an online bidding event over a computer network between panel members who choose to validate the BOM. In this bidding process, ratings are applied automatically to offers received from respective suppliers, in order to factor relevant supplier parameters into the tender process. When applied in a so-called 'reverse auction' process, the invention therefore affords dynamic comparison of offers as suppliers bid downwardly against one another to achieve the best result (lowest factored bid) for the buyer. The system and method described above has been tested extensively and shown to provide significant advantages over other approaches to online auctions.

In an alternative form, the invention involves an analogous 'factored pricing' process, allowing the buyer to apply factoring before issuing an RFQ to the prospective suppliers, or to allow a supplier to adjust specification criteria to effect 'self factoring' of an offer.

Under the rules of the method referred to above, the buyer sets a reserve price prior to a bidding event (eg prior to the release of the BOM), above which price he is not bound to accept an offer. Furthermore, the rules include the following:

The reserve is not disclosed to the suppliers until it is reached during the course of a bidding event.

Once the BOM is released, but before it has been activated (ie transferred from the 'Pending' page to the 'Active' page), the buyer may change the reserve price. This May occur, for example, once initial quotes have been received from suppliers as part of the BOM Validation phase (ie prior to auction commencement).

Once the reserve price is reached, the contract will be awarded to the bidder with the lowest factored bid at the close of the bidding event.

If the reserve is not reached, the buyer has the right not to proceed with any contract. If, however, the buyer chooses to proceed with awarding a contract, he should do so with the bidder holding the lowest factored bid at the dose of the bidding event, in order to retain the credibility, transparency and fairness of the process. The rules surrounding the event should preclude any post-event negotiation.

Once the reserve price is reached during the course of an online bidding event, this is indicated to all suppliers by an appropriate indicator or message on the Active (Bidding) screen.

A contract is therefore automatically awarded at the close of bidding, subject to the reserve price being reached. This is consistent with the aim of a negotiation being to reach an agreement.

When the reserve price is not reached in the course of the event, the buyer in fact has a choice. He may award the contract after bidding is completed, to the supplier with the lowest factored bid. This is a manual process and can be invoked any time after the close of the event, and the system includes an 'Award Contract' function for this purpose on the 'Active' and 'History' pages. This option is usually exercised when there is no possibility to delay the contract award for the goods or services being bid upon, and the current function allows only the lowest factored bidder to be awarded the contract, which is in keeping with preserving the fairness of the process and rewarding suppliers for participating in the bidding event.

Alternatively, where it is not necessary to complete the contract, the buyer is not obliged to award the contract to any supplier. In keeping with the requirement for no post-event (offline) negotiation, the contract is simply put aside and will be re-tendered at a later date either by auction or by other means, in the same form or with a different lot structure.

With online auction events of this type, a further alternative exists. The buyer may be unhappy with the outcome and decide to abandon the auction result and the rules of the online system. Following this the buyer may decide to negotiate directly with one or more of the suppliers offline, which is dearly undesirable for a number of reasons. The transparency and integrity of the negotiation process are undermined, and the supplier may become disenchanted with the process and refuse to participate in future events. This risks damaging the credibility and integrity of the system, and means that the audit trail and historical record of the outcome of the negotiation are likely to be lost. Clearly, in such offline negotiations it is likely that supplier or product differences will no longer be factored in accordance with the overall bidding event.

SUMMARY OF THE INVENTION

With the above problem in mind, the inventors of the present application have developed a new approach, which represents an improvement over current systems and methods. In accordance with the invention, there is provided a method of conducting an online auction between a controlling party and at least two competing participants, comprising the steps of:

(a) setting a reserve price for the auction;
  (b) conducting the auction between the at least two competing parties;
  (c) determining whether a predetermined time trigger has been reached, and suspending the auction if the reserve price is not reached at that time;
  (d) determining whether the controlling party has selected to enter an optional reserve price negotiation phase, and revising the reserve price for that reserve price negotiation phase;
  (e) and, accordingly, extending the auction based on the revised reserve price.

The 'controlling party' is the buyer, in the case of a reverse auction involving a buyer and multiple sellers, or the seller, in the case of a forward auction involving a seller and multiple buyers.

In this way, the reserve price revision may be optionally invoked at the discretion of the controlling party when the reserve price is not reached by the normal close of the bidding event. If an offer is received during the reserve price negotiation phase that satisfies the reset reserve price, then the offer may be accepted (and the contract awarded) at the close of that phase.

In this way, the credibility and transparency of the negotiation process is retained for the reserve price negotiation phase, allowing the buyer to keep all suppliers at the negotiation, and thus increasing the prospect of a negotiation outcome being finalised between the parties to said negotiation.

The predetermined time trigger may simply be the attainment of a point in time in accordance with a set duration of the auction (ie the close of the normal bidding event), or may be fixed in accordance with dynamic rules operating during the auction. For example, it may be fixed in accordance with the completion of an extension period triggered by a prescribed event in the course of the auction, or the suspension of the auction may take place if no offers are received for a prescribed time period.

Preferably, the step of extending the auction based on the revised reserve price involves repeating steps (b) to (d). In this way, the controlling party can optionally invoke a succession of reserve price negotiation phases, revising the reserve price set at each phase. Preferably, each reserve price negotiation phase is of a prescribed duration, such as 5 minutes.

In a preferred embodiment, the auction involves the award of a supply contract to a supplier selected from a panel of predetermined suppliers which each have a base supply contract with the buyer, and the computer network over which the online auction is carried out comprises at least one buyer computer, an administrator computer and at least two supplier computers, and the method includes the steps of:

establishing key parameters for a BOM to be submitted by the administrator computer to the at least two supplier computers (eg. price, quality, delivery and service);

establishing a rating for each supplier of the panel of predetermined suppliers related to said key parameters;

receiving offers during the auction from the supplier computers of suppliers; and applying the respective rating to offers received by the administrator computer from the supplier computers to adjust that offer prior to comparison of that offer with any other offer.

The step of applying a rating for each supplier may be based at least partially upon past performance of that supplier for each parameter. The parameters are, for example, previous timeliness of delivery of materials, quality of delivered materials, price, etc. The step of applying a rating for each supplier may be based at least partially upon other parameters outside the control of that supplier for each parameter, such as forecast material demand, commodity price forecasts, exchange rate forecasts, industry trends, historical bidding data, etc.

The BOM may include a time period for submissions of offers by said suppliers, and this time period may be extendable to enable submission of an improved final offer from at least some of the supplier computers from which offer messages were received. The suppliers able to submit offers during said extension period may be selected according to prescribed criteria (such as the suppliers with the 3 or 4 lowest offers), and the method may include the step of providing the supplier with the lowest offer at the expiry of the unextended time period an option to submit the very final offer of the bidding event.

Preferably, during the auction, each supplier is provided with a current bid to win (CBTW) in respect of the supply contract, the CBTW calculated by said administrator computer to dynamically indicate to a supplier an offer that that particular supplier must submit to remain competitive in the auction. The CBTW for a supplier is calculated in accordance with the formula:

$$CBTWx_m = FB_{n-1} - (MD/SFx)$$

where x indicates a particular supplier X; m indicates that particular supplier's bid number; n indicates the overall bid number (ie $1^{st}$ bid: n=1; $2^{nd}$ bid: n=2; etc); FB indicates a factored bid for said particular supplier; MD indicates a set minimum bid decrement; and SF is the supplier factor set in accordance with said supplier rating.

FB may be calculated in accordance with the formula:

$$FB_n = SBx_n + (MD/SFx) - MD$$

where SB is a submitted bid.

The method preferably includes the step of comparing the revised reserve price with offers previously received during the auction, to which offers said rating has been applied, before the reserve price negotiation phase is commenced. For each supplier, a CBTW may be calculated, based on a measure of the revised reserve price to which a respective supplier rating has been applied.

According to a further aspect of the invention, there is provided a system for conducting an online auction between a controlling party and at least two competing participants, comprising:

setting means for setting a reserve price for the auction;

comparison means for comparing a measure of each offer received during the auction from said at least two competing participants;

first determining means for determining whether a predetermined time trigger has been reached, and for suspending the auction if the reserve price is not reached at that time;

second determining means for determining whether the controlling party has selected to enter an optional reserve price negotiation phase, the setting means responsive to said second determining means to revise the reserve price for that reserve price negotiation phase; and means, responsive to said second determining means, for allowing extension of the auction based on the revised reserve price.

The system may include means for causing or permitting acceptance of an offer at the end of the reserve price negotiation phase if the offer satisfies the revised reserve price.

Preferably, the system comprises an administrator computer, the online auction involving the award of a supply contract to a supplier selected from a panel of predetermined suppliers which each have a base supply contract with the buyer, the computer network over which the online auction is carried out including at least one buyer computer and at least two supplier computers connecting to the administrator computer, wherein a rating is established for each supplier depending on key supply parameters, the administrator computer configured to apply the rating to any offer received by the administrator computer from the supplier computer of that supplier to adjust that offer prior to comparison other offers and/or with the revised reserve price during the reserve price negotiation phase.

Preferably, the system includes means for providing each supplier with a current bid to win (CBTW) in respect of the supply contract, the CBTW calculated by said administrator computer to dynamically indicate to a supplier an offer that that particular supplier must submit to remain competitive in the auction.

BRIEF DESCRIPTION OF THE DRAWINGS

A non-limiting embodiment of the invention will now be described by way of example only, with reference to the accompanying drawings, in which:

FIG. 4 provides a buyer-side bid history of an factored reverse auction including reserve price negotiation.

DETAILED DESCRIPTION OF THE INVENTION

Figure 1:
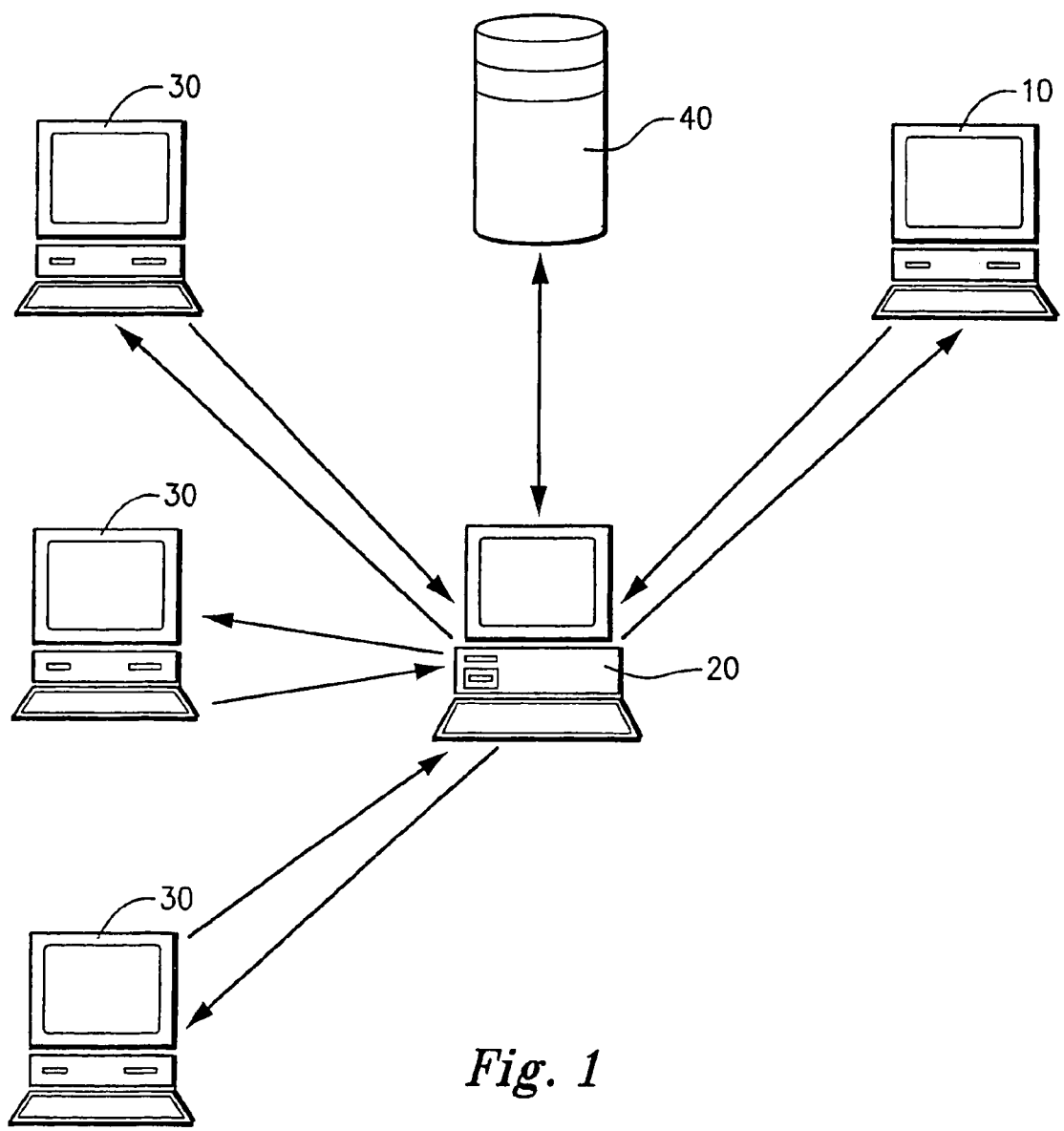
FIG. 1 schematically illustrates a system for carrying out the method of the invention.

A form of the system to which the invention may be applied is described in detail in copending application WO-02/21347, the entire content of which is included herein by reference thereto. This involves so-called 'factored bidding', which (in the context of a reverse auction) allows the buyer to set supply criteria for a particular subcategory of materials (so-called 'reverse factored auction', or RFA™). The system, schematically illustrated in accompanying FIG. 1, involves a computer network including at least one buyer computer 10, an administrator computer 20 and at least two supplier computers 30. These components are linked via the Internet or any other appropriate network system. It is to be noted that the system does not have to be third party controlled, as it can be initialised, updated and controlled by the procurement specialist within a buyer organisation. The concept of factored bidding will be briefly described below.

Each material subcategory (panel) can have different supply criteria. For example Toyota might, for a category 'Camry' and subcategory 'Tyres' set supply criteria as price, quality, delivery, and service. Whereas, for Toshiba, manufacturing laptop computers, the category 'Satellite Pro' and subcategory 'LCD Display' might have supply criteria of warranty, quality and price.

Once the actual criteria are identified, the buyer numerically rates the importance of each of the identified criteria, eg from a scale of 1 to 10 (the scale itself is not important as long as the rating is representative of the importance of the criteria in an absolute and a relative sense). As a purely fictional scenario, Toyota might set: price—9, quality—7, delivery—8, and service—6, out of a maximum score of 10 for each criteria established against Camry/Tyres. The buyer then considers how well each panel supplier for the specific subcategory is performing or should be rated (from historical interactions) against each of the identified criteria.

Toyota could have 3 suppliers that can all supply Camry tyres to the required specification ie Toyota has 3 approved Camry tyre suppliers that will form the panel for the Camry Tyres subcategory in the administrator computer. Toyota then creates an overall rating for each panel member. The factor and the ratings and criteria are visible to each supplier, which allows the latter to work with the buyer to improve their assigned factor. The rating for each supplier need not be expressed as a percentage value, but may instead be simple cost penalty to be applied to any bid provided by a supplier. For example, a supplier with a relatively high factor may be allocated a $1 rating, applied as a per unit cost penalty to any bid submitted by that supplier, whereas a supplier with a lower factor may be allocated a $2 rating.

Over time administrator computer 20 collects and stores data on all the supply criteria on connected database 40. This allows the administrator computer to help buyers make decisions about how to rate a particular supplier. For example the administrator computer measures payment time, and delivery time automatically from the buyer's ERP (Enterprise Resource Planning) system. This data is analysed and presented to the supplier as an input to the supplier rating process.

In the auction event, all submitted bids are factored in accordance with an appropriate algorithm, eg by adding a minimum decrement with the respective supplier factor applied. Given that there is a minimum bid decrement (to avoid immaterial bids) and that the supplier submitted bids are factored, it is difficult for suppliers to readily calculate their next bid in order to hold the current bid. For this reason, an additional information field is provided, labelled 'Current Bid To Win' (CBTW). This field is related directly to the supplier factor and effectively tells a supplier the maximum that they can enter as a submitted bid.

The premise of factored bidding is therefore that suppliers with higher ratings can bid higher amounts than those with lower ratings and still win the business. By factoring the minimum decrement and subtracting this from the last factored bid, the bid a supplier needs to submit to win the business can be calculated and displayed to the supplier. In this way, the auction event is run according to buyer-determined premiums or discounts, as opposed to supplier-determined ones.

The CBTW for a particular supplier is calculated by the administrator computer in accordance with the following formula:

$$CBTWx_m = FB_{n-1} - (MD/SFx) \qquad (Eq.1)$$

where x indicates a particular supplier X; m indicates that particular supplier's bid number; n indicates the overall bid number (ie $1^{st}$ bid: n=1; $2^{nd}$ bid: n=2; etc); FB indicates a factored bid; MD indicates a set minimum bid decrement; and SF is the supplier factor set in accordance with the supplier rating.

FB may be calculated in accordance with the formula:

$$FB_n = SBx_n + (MD/SFx) - MD \qquad (Eq.2)$$

where SB is a submitted bid.

In general, an online bidding event is run for a fixed period of time (such as thirty minutes). At the end of this time, as measured by the server dock, the lowest factored bid is accepted. The use of a fixed period of time contributes to the efficient price discovery mechanism of the process, and encourages bidders (suppliers) to enter their bids within this prescribed period (which is published in advance). By limiting the entire event to a reasonably short period, bidders are encouraged to actively view and participate in the event, rather than simply to enter a bid then logoff.

In certain situations, the bid submission may be affected by the participants' physical ability to respond. This effect can mean that the buyer may not receive the very best offer possible, because the event time may expire before a counter bid can be made.

For the above reasons, it is possible to include in certain online auctions the function of an automatic extension of the event duration, if a bid is received within a specified window at the dose of the event (typically five minutes). The event is then extended by, say, an additional fifteen minutes. This time extension capability is particularly useful with high value, strategic materials where significant shifts in the bidding activity can occur in the final stages of an online event. The application can include an additional parameter to specify a maximum number of extension periods.

An alternative approach, referred to herein as the 'Best and Final Bid' function, applies a systematic approach, wherein suppliers who have submitted a bid during the course of the normal bidding event are given the opportunity to submit a 'best and final bid' (BAF) once the event has concluded, if certain determined criteria are met.

A reserve price is always set prior to commencement of a bidding event. In accordance with conventional bidding events, once the reserve price is reached, the contract is awarded to the bidder with the lowest factored bid at the close of the bidding event. If the reserve price is not reached, problems can arise if negotiations are taken 'offline', as outlined in the introductory portion of this description.

The system therefore includes a functionality for reserve price negotiation (RPN™). This retains the credibility and transparency of the negotiation process and allows the buyer to keep all suppliers in the contest (or at the Virtual Negotiation Table™) thus ensuring that the buyer has every opportunity to award the business to the best value supplier, by preserving the relative differences via the factoring.

RPN Function

The Reserve Price Negotiation (RPN) function is an option that may be invoked at the discretion of the buyer when the reserve price is not reached by the dose of an online bidding event. The close of the event includes any bid extension periods that may result from the rules of the event.

Figure 2:
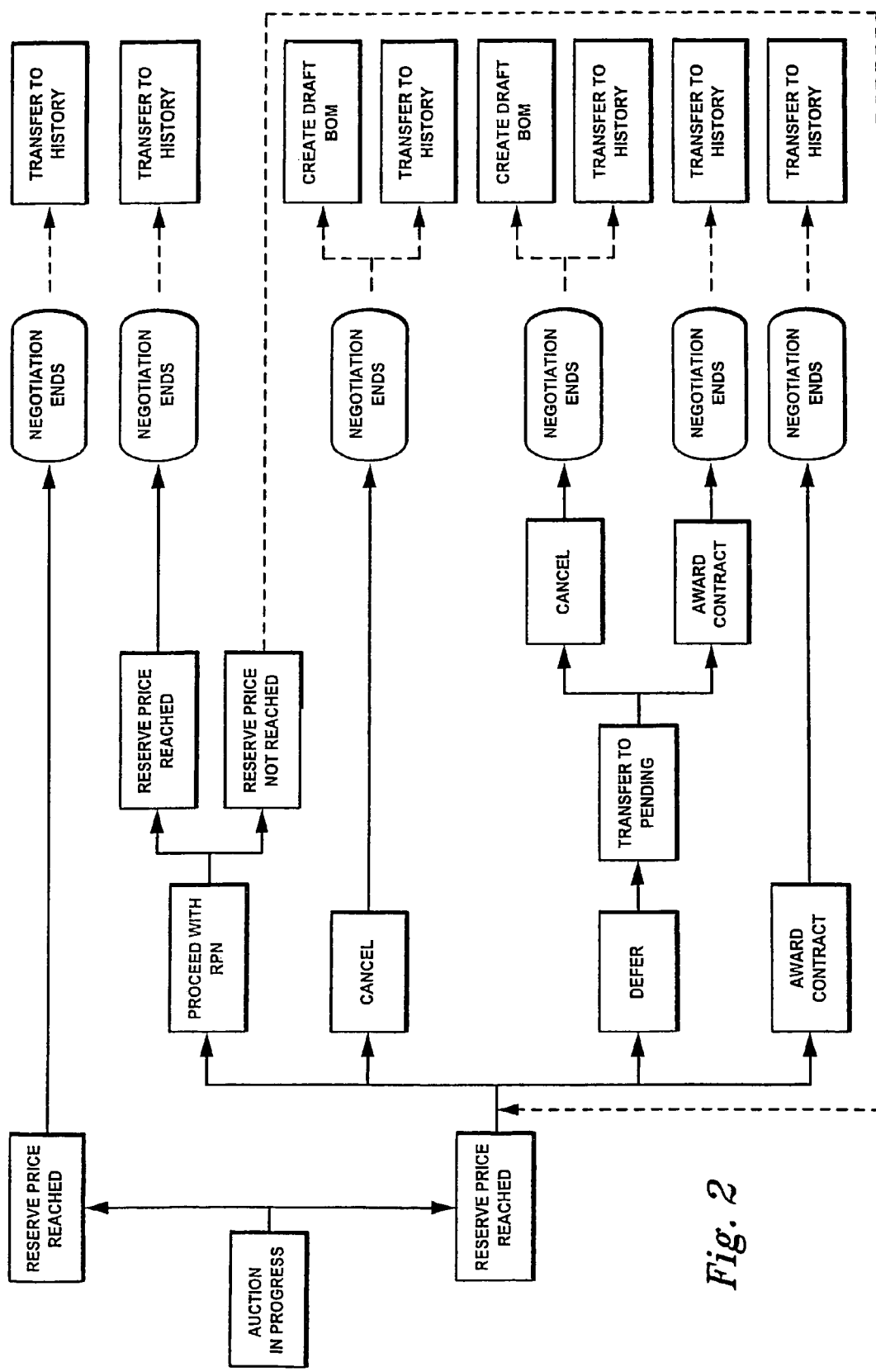
FIG. 2 is a flowchart illustrating the process flow of the reserve price negotiation function.
Figure 3:
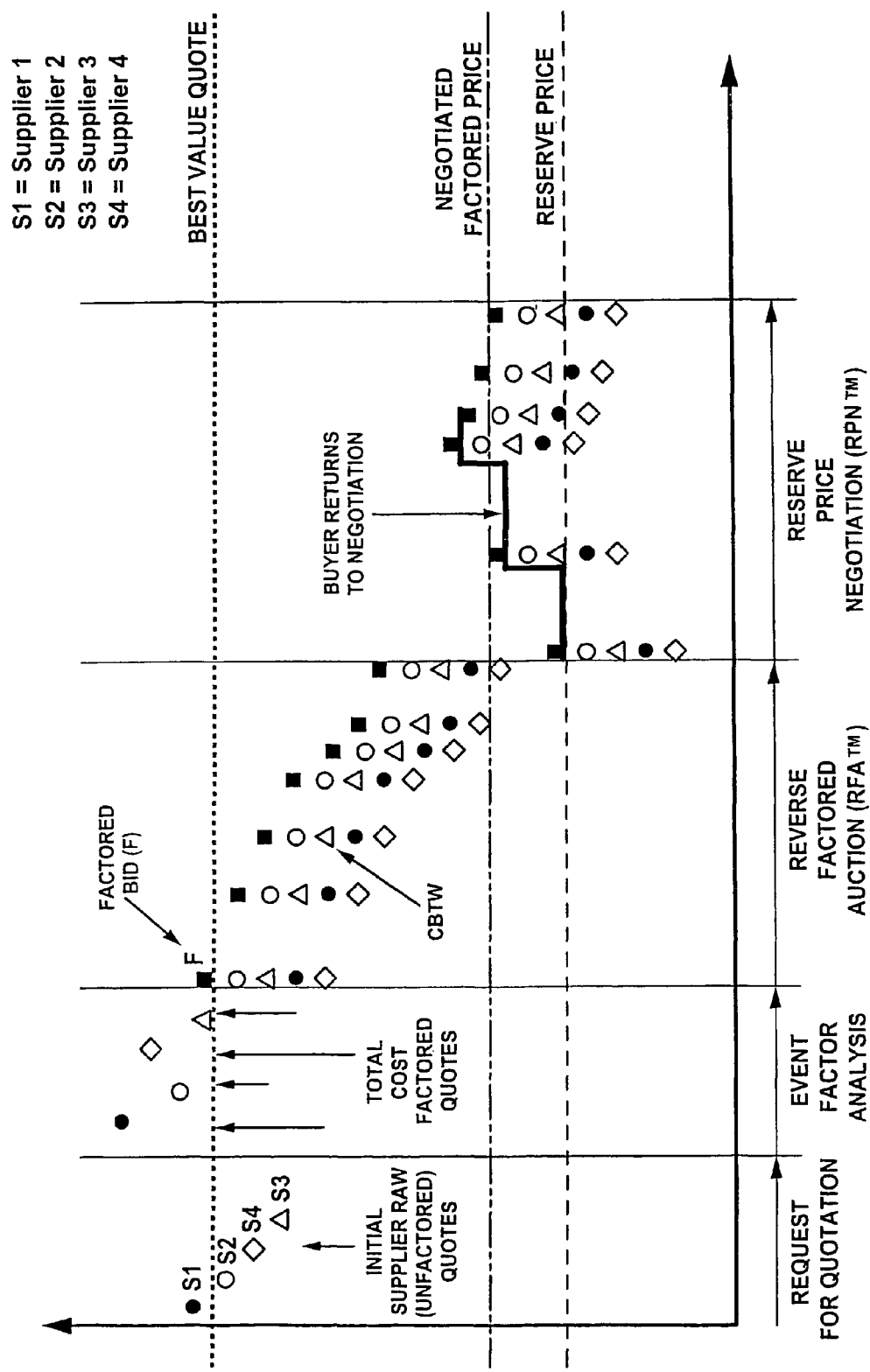
FIG. 3 illustrates in chart form the process of an online factored reverse auction including both the pre-event stages and reserve price negotiation phases.

The buyer may adjust the reserve price iteratively, according to a minimum increment or decrement, and allow suppliers to place additional bids. The process flow for the function is illustrated schematically in FIGS. 2 and 3, and explained in further detail with respect to the summary logic flow below.

The 'raw' (unfactored) reserve price must be converted into a factored reserve price, which is the minimum of the factored reserve prices calculated for all suppliers (or, put another way, the factored reserve price based on the supplier with the highest bidding factor). This has the effect of ensuring that when the best performing supplier reaches the unfactored reserve price, then all the other suppliers will also be at or below that reserve price.

More specifically, considering the factoring process expressed by equations 1 and 2 above, the setting of a revised reserve price has the effect of overriding this functionality.

The factored reserve price FRP is thus:

$$FRP = ARP + (MD/SF) - MD$$

where ARP=actual reserve price and SF=best supplier factor. This is a similar concept to recalculating a factored starting price every time a supplier validates the BOM.

The CBTW is set for each supplier in accordance with the revised reserve price (ie the factored bid $FB_n$ is forced to equal the factored reserve price), and the buyer is able selectively to further increase the reserve price if no suitable bids are received, which has the effect of again revising the CBTW. If a supplier submits a bid that satisfies the reserve price, then the functionality expressed in the above equations applies once more in an active bidding process.

Buyer Functions

The RPN function may operate over a set number of periods, similar to the concept of a time extension function, each period being a predetermined length (eg five minutes). The parameters for this ('RPN Period: <nnn> minutes') are specified in the auction design on the 'Market Rules' page, where rules such as 'BOM Bid End Time' and 'Minimum Bid Decrement' are set for the auction event. Optionally, a time extension function can be added to the RPN period with the same logic as current functionality. Effectively the RPN function can therefore be seen as re-running the closing part of the bidding event, but with an amended reserve price parameter.

The buyer may increase the reserve price, by any amount (preferably greater than or equal to a minimum increment to make the process meaningful) and then allow all bidders to place bids, their respective 'current bid to win' (CBTW) figures re-calculated based on the basic reserve price. As explained above, the CBTW is a (factored) figure provided to competing suppliers calculated to dynamically indicate to respective suppliers the particular offer that the respective suppliers must submit to compete with the best previous offer.

Logic Flow

The following indicates the broad logic flow of the system.
Auction is running without reserve price being reached
Status: NEGOTIATION IN PROGRESS
    RESERVE PRICE NOT REACHED
Auction ends with reserve price not reached.
Status: NEGOTIATION PENDING
    RESERVE PRICE NOT REACHED This alerts suppliers that an agreement has not been reached and the contract has not been finalised. In addition, at the end of the bidding event, a screen message is generated to the buyer and suppliers to inform them explicitly what has happened (eg 'Contract awarded', or 'RPN Negotiation to commence').

The buyer is then presented with a standard dialogue box setting out the following options to invoke the RPN function, whilst the suppliers are presented with a dialogue box informing them that the event is pending and that they should standby to determine what course of action the buyer will take to finalise the negotiation.

The choices are:
(a) Proceed with reserve price negotiation (see further detail below). Note that this can only be invoked at the time of the event, to ensure that the dynamics of the online negotiation are preserved.
    Status: RESERVE PRICE NEGOTIATION
        RESERVE PRICE NOT REACHED
(b) Cancel. The contract is cancelled and no-one is awarded the business. This end state results in a draft BOM being created on the 'Pending' page of the application, and the live BOM being transferred to the 'History' page. If the BOM is not to be tendered again at a later date, the buyer needs to delete it from the 'Pending' page.
    Status: NEGOTIATION CANCELLED
        RESERVE PRICE NOT REACHED
(c) Defer. The contract award is deferred and may be subsequently awarded via the 'Award Contract' function. After the day of the event, the BOM is transferred to the 'Pending' page, rather than the History page. A draft BOM is not created, since an end state has not yet been reached. The action available from the 'Pending' page is 'Close Event', the actions being associated with this being 'Cancel' or 'Award', to reach an acceptable end state. Once this is done, the BOM is transferred to the 'History' page, with the appropriate status recorded.
    Status: CONTRACT AWARD DEFERRED
        RESERVE PRICE NOT REACHED
(d) Award Contract. This option awards the contract to the lowest factored bidder, although an option may be provided to allow a provisional contract award, for example if the buyer needs additional information before awarding the contract outright.

Status: CONTRACT AWARDED
RESERVE PRICE NOT REACHED

If the buyer chooses to select the RPN option, he can then change the reserve price. This is usually upwards, but it can also be downwards, at least for the first RPN period.

The RPN period is then started with the CBTW of each supplier recalculated and displayed to the respective suppliers. The CBTW is initially calculated as if the factored bid were set to the factored reserve price. The suppliers can readily determine whether and how the reserve price has moved, since their CBTW will have changed.

If there is no response within the RPN period, the buyer has the option of changing the reserve price and entering into another RPN round. Under this scenario, the buyer is presented with the same options as set out above.

If a supplier responds with a bid during the RPN period, then the remaining set time for the RPN is effectively cancelled (eg 1 minute into a 5 minute RPN period):

Status: NEGOTIATION IN PROGRESS
RESERVE PRICE REACHED

The supplier response triggers a counter bid period of, say, 5 minutes. Since one supplier now holds the bid at the reserve price, if there are no further bids, that supplier will be awarded the contract. If a competing supplier lodges a counter bid, then the event will proceed as if it were a conventional event in its final stages (ie, if a bid is lodged within the time extension activation period, then the normal time extension logic applies). A parameter is included in the auction design on the 'Market Rules' page as: 'Counter Bid Period: <nnn> minutes'.

The first RPN period can be at or above (or below) the original reserve price. This gives the bidders a final opportunity to bid for the buyer's business at his initial reserve.

Subsequent RPN periods must have a reserve price that is at least one minimum increment above the previous reserve price. In just the same way that spurious or non-material bids from suppliers are not desirable, a similar discipline is enforced on buyers.

The 'Buyer Active' screen includes function similar to the 'Supplier Active' screen, as the buyer can submit a revised reserve price. The confirmation dialog indicates the basic reserve price and the factored reserve price, in the same manner that supplier bids are confirmed:

| Current Reserve Price | Factored Reserve Price |
|---|---|
| 999,999,999.99 <Cur> | 999,999,999.00 <Cur> |
| Next Minimum Reserve Price | |
| 999,999,999.99 <Cur> | |
| Reserve Price | |
| <Cur> | <Submit> |

Similar logic and informational display as that used in respect of bid extension information is necessary during the RPN period (ie RPN Period <nn> of <nn>) displayed above a bidding graph presented on the 'Active' page.

As mentioned above, since the online bidding event uses 'factored prices', the test to determine whether the reserve price has been reached is based on a 'factored reserve price' (FRP). The factored reserve price is calculated in a similar manner as the factored bids (FRP=RP+(MD/SF)−MD). Since the supplier factor (SF) is likely to be different—based on relative performance—for each supplier, the calculated FRP will also be different for each supplier. A supplier with a lower rating than another, will have a higher FRP. For this reason, in order to ensure that the 'RESERVE PRICE REACHED' indicator is not activated until the buyer-determined raw reserve price (RP) has been reached by all suppliers, the FRP for each supplier is first calculated, then the lowest of these is then taken as the FRP that is checked against each bid. The same result is achieved by calculating the FRP with the formula above for the best performing supplier (ie the supplier with the highest SF).

A rule is built into the application to ensure that the new reserve price does not result in a factored reserve price that is greater than the lowest factored bid received during the auction:

Factored RP≦Lowest Factored Bid (LFB)

Where the calculated starting price has been overridden, a rule is built into the application to ensure that the new reserve price does not result in a factored reserve price that is greater than the lowest factored quote. It is to be noted that this logic would allow the initial starting price—which is factored—to be exceeded. This case needs to be checked for events in which the starting price has been overridden and no bids lodged during the event.

Factored RP≦Lowest Factored Quote (LFQ)

If the buyer enters a reserve price such that the factored reserve price is equal to the LFB or LFQ, then a warning message is displayed with the option to 'Proceed' or 'Cancel' the input. If the buyer chooses to proceed with this option, the reserve price is set exactly equal to the LFB or LFQ (as the case applies). This has the same effect as accepting a valid bid from the relevant supplier.

The buyer can then keep increasing the reserve price (by minimum increments) until a supplier enters a bid. The system can include a function analogous to the CBTW for the reserve price displayed to the buyer (Next Minimum Reserve Price, NMRP).

The RPN period is clearly indicated above the event display graph, eg via a status indicator "RESERVE PRICE NEGOTIATION".

The application of the RPN function into a bidding event is set via an optional flag associated with setting up the event on the current 'Market Rules' screen. The information necessary for the setup of this function on the 'Market Rules' page is as follows, and it is to be noted that in general these are very similar, and use similar field semantics, to the options for setting up time extension parameters:

Screen sub-section title: RESERVE PRICE NEGOTIATION
Reserve Price Negotiation:
Options: Supported/Not Supported
RPN Period: <nnn> Minutes
Max. No. of Periods: <nnn>
Counter Bid Period: <nnn> Minutes
Minimum RP Increment: (Note that this is not disclosed to suppliers when they view the 'Market Rules' page)
Currency: (this defaults to the same currency as for this event, which means that this is a 'display only' field).

The 'Bid History' for the buyer retains a record of the changes to the reserve price. A column appears on this page showing the reserve price, and also recording the initial reserve price applied during BOM creation, as well as any changes prior to the event in overriding the reserve price. By way of example, FIG. 4 shows a buyer bid history page for a factored reverse auction event that includes time extension and reserve price negotiation.

A 'View Only' logon role is also available for buyers, as the buyer now has a much more interactive 'Active' page.

In order to finalise the negotiation, the buyer may allow the bidders to optionally submit a 'Best and Final' (BAF) bid, which does not necessarily conform to their CBTW. The only check that the system needs to carry out is to verify that the BAF bid is less than that supplier's previous bid (or initial quote, if that supplier has not placed a bid during an auction event). The BAF option may be applicable if the reserve price has not been reached by the dose of the RPN phase, or where there is the a possibility of the winning supplier defaulting, and the buyer requires an opportunity to consider reversion to the next lowest factored bidder.

Supplier Functions

When the RPN function is invoked, the suppliers remain on the 'active' screen. Since the active screen will still be refreshing itself according to the prescribed refresh frequency, the suppliers will take note of the negotiation status to understand what course of action the buyer intends to take. Initially, before the reserve price is reached, each supplier is presented with a CBTW based on the reserve price. Once the RPN phase is activated, a clear indication is provided to all suppliers (eg a red traffic light screen symbol) that they do not hold the bid, even though a supplier may have submitted the lowest factored bid during the auction event so far. In addition, the 'Submitted Bid' and 'Factored Bid' fields are cleared on all supplier 'Active' pages to indicate clearly that none of them hold the bid.

All Suppliers who have validated the BOM are able to participate in the RPN.

The first supplier to meet the reserve price—by bidding at or below their CBTW figure—will hold the winning bid at that point. The other suppliers may submit counter bids in relation to the bid, based on the normal rules associated with the bidding event.

Once the reserve price negotiation period is passed, a clear message or status indicator appears on the screen to indicate that the negotiation has been concluded (ie that the event is completed and that a contract has been awarded).

This functionality may also allow suppliers to change their values of the negotiable factors during the reserve price negotiation period. For example, a supplier may change his payment terms from 60 to 90 days which will, other things remaining equal, increase the CBTW for that supplier. An additional parameter for a 'time fence' may be applied in this respect, whereby such changes that effect the supplier factor may only be made up until a predetermined point before the close of the event. This allows the participating suppliers to focus on a single parameter (price) during the final stages of the online auction process.

The invention therefore provides an effective negotiation opportunity, with the buyer entering into the decision making process, whilst maintaining the process within the set rules of the system, ensuring that offers are still compared in accordance with the appropriate supplier ratings, and maintaining the audit trail on the bidding process. The invention has particular application with respect to factored bidding in reverse auction scenarios, but the reserve price negotiation methodology can be used in any type of online auction process (including forward auction).

The present invention may be applied to the procurement process for any goods or services which are sufficiently valuable (to justify use of the process), specifiable (so that competing suppliers are able to interpret the requirements, and to afford a consumer basis for comparison), and contestable (ie more than one supplier has the capability to fulfil the request). Although the examples given in this description relate to 'direct' material, used as direct inputs to a manufacturing process, the invention is equally applicable to 'indirect' inputs (travel, freight, consumables, etc.) or services.

The word 'comprising' and forms of the word 'comprising' as used in this description does not limit the invention claimed to exclude any variants or additions.

Modifications and improvements to the invention will be readily apparent to those skilled in the art. Such modifications and improvements are intended to be within the scope of this invention.

The invention claimed is:

1. A method of conducting an online auction between a controlling party and at least two competing participants, the method conducted within a computer network comprised of at least one controlling party computer, an administrator computer, and a participant computer associated with each of the at least two competing participants, the method comprising:

(a) setting, using an administrator computer, a reserve price for the online auction;

(b) conducting, using the administrator computer, the online auction between the at least two competing parties;

(c) determining, using the administrator computer, whether a predetermined time trigger has been reached;

(d) in response to a determination that the reserve price has not been reached when the predetermined time trigger has been reached, determining, using the administrator computer, whether the controlling party has selected to enter a reserve price negotiation phase, and revising the reserve price for that reserve price negotiation phase;

(e) accordingly, extending the online auction, using the administrator computer, into a reserve price negotiation phase based on the revised reserve price, wherein the auction involves the award of a supply contract to a supplier selected from a panel of predetermined suppliers which each have a base supply contract with the buyer, and the computer network over which the online auction is carried out comprises at least one buyer computer, an administrator computer, and at least two supplier computers, the method including the steps of:

establishing key parameters for a bill of materials (BOM) to be submitted by the administrator computer to the at least two supplier computers;

establishing a rating for each supplier of the panel of predetermined suppliers related to said key parameters;

receiving offers during the auction from the supplier computers of suppliers;

applying the respective ratings to offers received by the administrator computer from the supplier computers to adjust that offer prior to comparison of that offer with any other offer, wherein each supplier is provided with a current bid to win (CBTW) in respect of the supply contract, the CBTW calculated by said administrator computer to dynamically indicate to a supplier an offer that that particular supplier must submit to remain competitive in the auction, and wherein the CBTW for a supplier is calculated in accordance with the formula:

$$CBTWx_m = FB_{n-1} - (MD/SFx)$$

where x indicates a particular supplier X; m indicates that particular supplier's bid number; n indicates the overall bid number (i.e. 1st bid: n=1; 2nd bid: n=2; etc); FB indicates a factored bid for said particular supplier; MD indicates a set minimum bid decrement; and SF is the supplier factor set in accordance with said supplier rating.

2. The method of claim 1, wherein the online auction is a reverse auction involving a buyer and multiple sellers, and the controlling party is the buyer.

3. The method of claim 2, wherein the revising of the reserve price involves setting a higher reserve price.

4. The method of claim 1, including the additional step of
(f) accepting, at the close of the reserve price negotiation phase, an offer received during said phase that satisfies the revised reserve price.

5. The method of claim 1, wherein said predetermined time trigger is the expiry of a set period of the auction.

6. The method of claim 1, wherein said predetermined time trigger is fixed in accordance with dynamic rules operating during the auction.

7. The method of claim 1, wherein said predetermined time trigger is set in accordance with the completion of an extension period triggered by a prescribed event in the course of the auction.

8. The method of claim 1, wherein steps (b) to (d) are repeated such as to invoke a succession of two or more reserve price negotiation phases.

9. The method of claim 1, wherein the BOM includes a time period for submissions of offers by said suppliers, this time period being extendable to enable submission of an improved final offer from at least some of the supplier computers from which offers were received.

10. The method of claim 9, wherein said optional reserve price negotiation phase has a set duration, this duration being extendable to enable submission of an improved final offer from at least some of the supplier computers from which offer messages were received during the reserve price negotiation phase.

11. The method of claim 1, wherein the factored bid is calculated in accordance with the formula:

$$FB_n = SBx_n + (MD/SFx) - MD$$

where SB is a submitted bid.

12. The method of claim 1, including the step of comparing the revised reserve price with offers previously received during the auction, to which offers said rating has been applied, before the reserve price negotiation phase is commenced.

13. The method of claim 1, including the step of calculating, for each supplier, a CBTW based on a measure of this revised reserve price to which a respective supplier rating has been applied.

14. The method of claim 1 including, for the reserve price negotiation phase, providing to each competing participant an indication of the revised reserve price.

15. The method of claim 1, wherein the key parameters established are selected from the group of price, quality, delivery, and service.

16. A system for conducting an online auction between a controlling party and at least two competing participants, comprising:
setting means for setting a reserve price for the auction;
comparison means for comparing a measure of each offer received during the auction from said at least two competing participants;
first determining means for determining whether a predetermined time trigger has been reached;
second determining means for determining, in response to a determination that the reserve price is not reached at that time, whether the controlling party has selected to enter a reserve price negotiation phase, the setting means responsive to said second determining means to revise the reserve price for that reserve price negotiation phase;
means, responsive to said second determining means, for allowing extension of the auction into a reserve price negotiation phase based on the revised reserve price; and
wherein the auction involves the award of a supply contract to a supplier selected from a panel of predetermined suppliers which each have a base supply contract with the buyer, and the computer network over which the online auction is carried out comprising at least one buyer computer, an administrator computer, and at least two supplier computers, further comprising:
establishing means for establishing key parameters for a bill of materials (BOM) to be submitted by the administrator computer to the at least two supplier computers;
rating means for establishing a rating for each supplier of the panel of predetermined suppliers related to said key parameters;
receiving means for receiving offers during the auction from the supplier computer of suppliers;
applying means for applying the respective ratings to offers received by the administrator computer from the supplier computers to adjust that offer prior to comparison of that offer with any other offer,
wherein each supplier is provided with a current bid to win (CBTW) in respect of the supply contract, the CBTW calculated by said administrator computer to dynamically indicate to a supplier an offer that that particular supplier must submit to remain competitive in the auction, and
wherein the CBTW for a supplier is calculated in accordance with the formula:

$$CBTWx_m = FB_{n-1} - (MD/SFx)$$

where x indicates a particular supplier X; m indicates that particular supplier's bid number; n indicates the overall bid number (i.e. 1st bid: n=1; 2nd bid: n=2; etc); FB indicates a factored bid for said particular supplier; MD indicates a set minimum bid decrement; and SF is the supplier factor set in accordance with said supplier rating.

17. The system of claim 16, including means for causing or permitting acceptance of an offer at the end of the reserve price negotiation phase if the offer satisfies the revised reserve price.

18. The system of claim 16, the online auction involving the award of a supply contract to a supplier selected from a panel of predetermined suppliers which each have a base supply contract with the buyer, the computer network over which the online auction is carried out comprising at least one buyer computer, an administrator computer and at least two supplier computers, further comprising:
rating means for establishing a rating for each supplier depending on key supply parameters, and
applying means, associated with the administrator computer, for applying the rating to any offer received by the administrator computer from the supplier computer of that supplier to adjust that offer prior to comparison with other offers and/or with the revised reserve price during the reserve price negotiation phase.

19. The system of claim 18, including means for providing each supplier with a current bid to win (CBTW) in respect of the supply contract, the CBTW calculated by said administrator computer to dynamically indicate to a supplier an offer that that particular supplier must submit to remain competitive in the auction.

20. The system of claim 16, including means for, for the reserve price negotiating phase, providing to each competing participant an indication of the revised reserve price.

* * * * *